Dec. 20, 1938.   C. R. BUSCH   2,140,982
BRAKE BEAM SUPPORT OR THE LIKE
Filed June 15, 1937   2 Sheets-Sheet 1
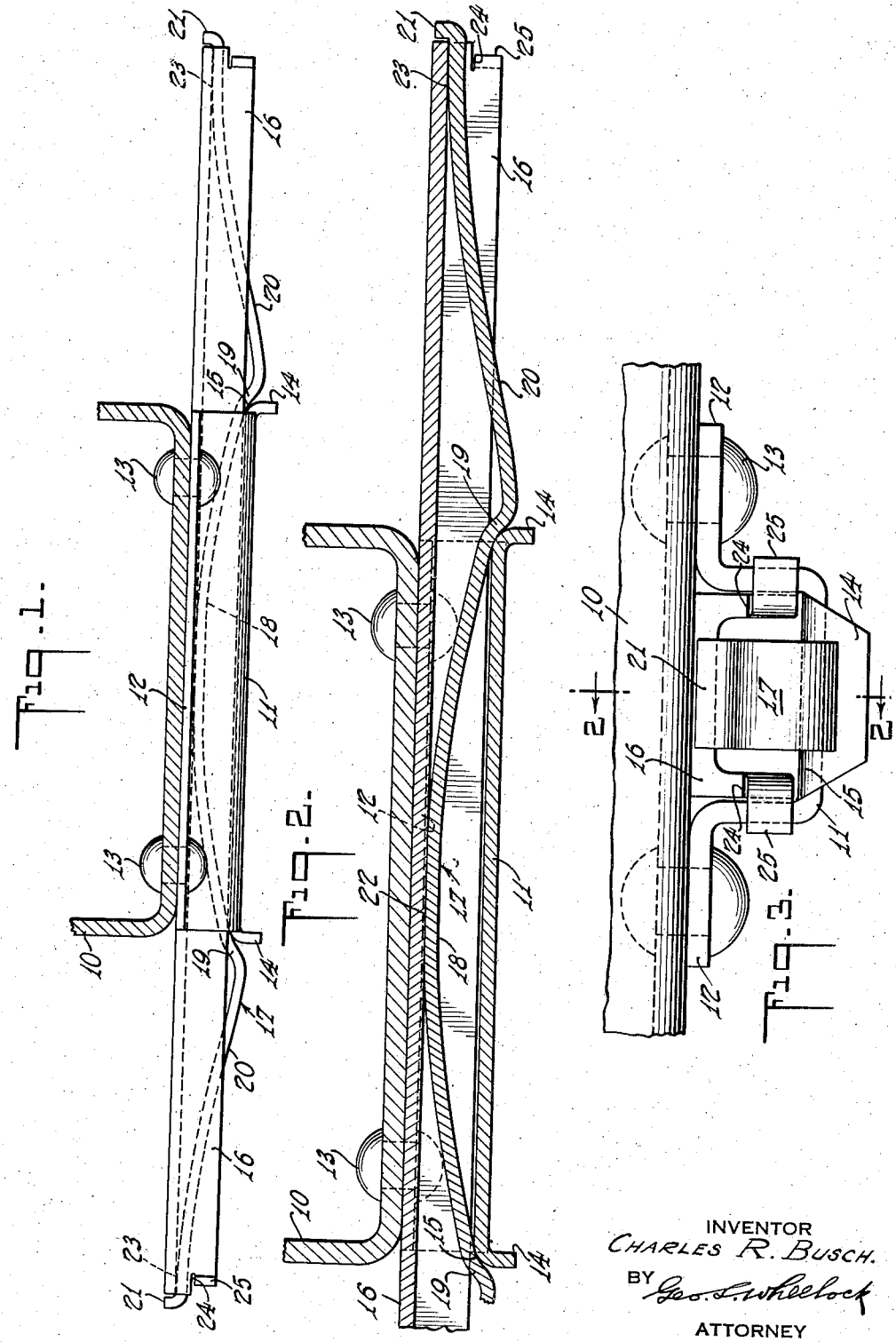
INVENTOR
CHARLES R. BUSCH.
BY Geo. S. Wheelock
ATTORNEY Dec. 20, 1938.        C. R. BUSCH        2,140,982
BRAKE BEAM SUPPORT OR THE LIKE
Filed June 15, 1937        2 Sheets-Sheet 2
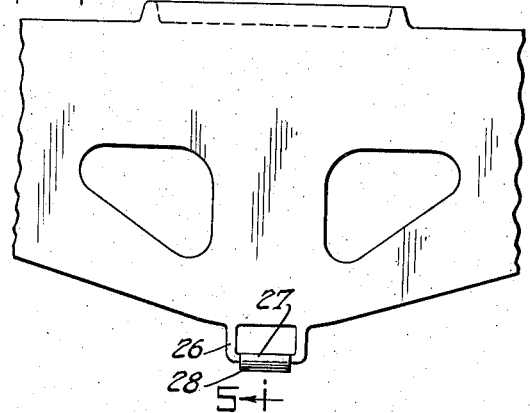
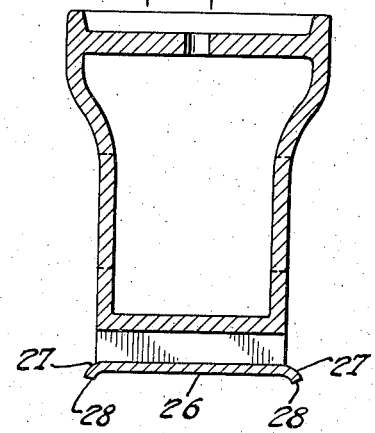
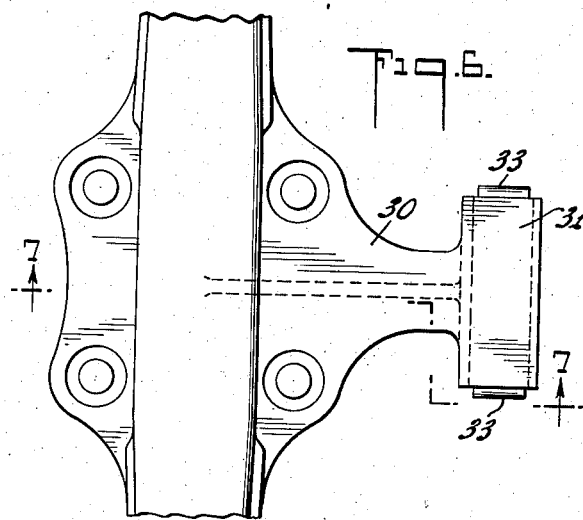
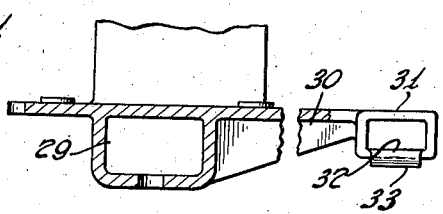
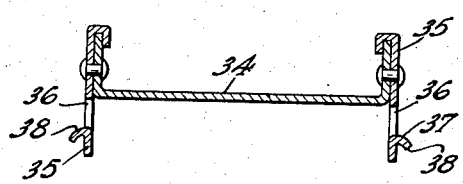
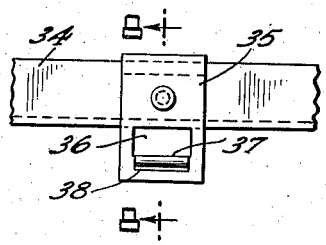
INVENTOR
CHARLES R. BUSCH.
BY
ATTORNEY Patented Dec. 20, 1938

2,140,982

UNITED STATES PATENT OFFICE 2,140,982

BRAKE BEAM SUPPORT OR THE LIKE

Charles R. Busch, Orange, N. J., assignor to Buffalo Brake Beam Company, New York, N. Y., a corporation of New York Application June 15, 1937, Serial No. 148,290

22 Claims. (Cl. 188—210)

So far as I am aware brake beam supports or the like are secured in position underneath the brake beams by fastenings of various sorts or by means of springs of one kind or another, but the extended ends of the supports which serve to catch a beam in case it drops, are usually left so as to freely extend underneath the beams and they are not so mounted and supported that the extended ends may not set up vibrations in the nature of a whipping of each extended end resulting in rattling, shocks and sometimes in disaster. This whipping action is set in motion by the vibrations of the spring plank or other portions of the car truck on which the brake beam supports or safety bars are mounted, and unless this whip is practically if not entirely eliminated, the vibrations will transfer their effect to the attaching means for the support and cause great wear, loosening of rivets and breakage of the supports or bars.

With a view to overcoming the above mentioned objections and others, an object of the present invention is to provide a suitable brake beam support that preferably eliminates all separate locking devices in the form of extra parts, and to provide a support that is self-locking. Preferably therefore each safety bar or the like is supplemented only by a shock absorbing spring which not only absorbs the shocks and vibrations at points in the direct region of the spring plank or other supporting member of a car truck, but especially absorbs them at points beyond such region and preferably up to the extreme terminals of the safety bar.

Other objects of the invention are to provide simple and efficient means for supporting brake beams in case they drop, and preferably wherein a safety bar and a shock absorbing spring are combined so as to mutually coact to have a distinct tendency to eliminate, and probably entirely eliminate, the whipping of the extended ends of the safety bar due to truck shocks and vibrations.

These being among the objects of the present invention, the same consists of certain features of construction and combinations of parts to be hereinafter described and then claimed with reference to the accompanying drawings showing one embodiment of the invention and wherein Fig. 1 is a cross-section of a spring plank showing the improved brake beam support in side elevation and partly in broken lines;

Fig. 2 is an enlarged longitudinal section on line 2—2, Fig. 3, parts being broken away;

Fig. 3 is an end elevation of the improved support shown as mounted upon a spring plank;

Fig. 4 is an elevation of a fragment of a car truck bolster, illustrating a modification of the invention;

Fig. 5 is a section thereof on line 5—5;

Fig. 6 is a plan of a fragment of a car truck side frame, illustrating another modification;

Fig. 7 is a section thereof on line 7—7;

Fig. 8 is a cross-section of a spring plank on line 8—8, Fig. 9, and illustrates a further modification of the invention; and Fig. 9 is a side elevation thereof.

Referring to the drawings, the improvements are shown as mounted upon a spring plank 10, but it will be obvious herefrom that the improvements may be applied to a bolster or side frame of a railway car truck. As shown herein by way of example, there is a bracket 11 in the form of a housing or casing, the same constituting a mounting and being preferably bent into U-shape in cross-section and provided on opposite walls with oppositely extending side flanges 12, all preferably formed from suitable wrought, cast or forged steel. Through suitable openings in the spring plank 10 and in the flanges 12 rivets or fastenings 13 are passed and the ends thereof are headed upon both the top surface of the bottom of the spring plank and upon the under surfaces of the flanges, thereby to rigidly mount the housing or bracket 11 upon the spring plank so as to extend transversely thereof from side to side. The length of the bracket or housing 11 is preferably somewhat less than the entire width of the spring plank.

The housing or bracket 11 is provided at its ends with down turned lips 14 which are located at points between the side walls of the housing. By bending downwardly the lips 14, the ends of the bracket or housing 11 are provided with rounded surfaces 15 which provide bearing points or surfaces as will presently appear.

A safety bar or auxiliary support member 16 may be of any of the usual types, such as a bar consisting of a channeled section of suitable metal, and preferably the same is a straight section having considerable stiffness, although such bars are not made of such weight, thickness and strength as to eliminate any tendency to objectionable vibrations or whipping of the ends which usually extend out beyond the spring plank or the like. Such a safety bar or auxiliary support under the present invention is subjected to the action or tension of a spring 17 which consists of a preformed length of suitable spring steel so shaped or constructed as to provide means for not only locking the safety bar 16 in its place, but for eliminating objectionable whipping or vibrations of the extended ends of the bar. Both the safety bar 16 and the spring 17 are passed through the bracket or housing 11, and the spring is shown as somewhat longer than the safety bar, although its length may be varied, depending more or less upon the inherent degree of stiffness of the safety bar.

As shown, the intermediate portion 18 of the length of the spring 17 is bowed, the degree or set of the bowing being of course variable. At the ends of the bowed portion 18, the spring is provided with deflected portions 19, that is, such portions are deflected in opposite direction to the bowing of the spring, to provide shoulders which face more or less toward each other.

Each end portion 20 of the spring 17 is extended for a considerable distance beyond the bow 18 and the shoulders 19, and these extended end portions 20 may have a straight set when free or may be slightly bowed in the same general direction as that in which the bow 18 extends. The deflected portions 19 preferably join the bowed portion 18 and the extended portions 20 in more or less compound curves. The extremity of each end portion 20 is provided with an outwardly deflected toe 21, such toes being preferably parallel with each other. A suitable strip of spring steel lends itself nicely to the deformation and preferred curving such as shown, although of course the shape may be changed. Preferably these toes 21 are spaced apart for a distance a trifle greater than the length of the safety bar or the like 16.

In applying the present improvements to a bracket or housing 11, the spring 17 may be inserted into the bracket in such a manner as to cause the center of the bow 18 to come opposite the central line of the spring plank, as shown in Figs. 1 and 2, thereby positioning the shoulders 19 at points at the ends of the bracket or housing which are opposite to the end bearing surfaces 15 of the bracket or housing, and then the extended end portions 20 of the spring will project in opposite directions beyond the ends of the housing or beyond the sides of the spring plank or whatever member of the car truck is to support the assemblage. The weight of the spring and the mutual interlocking cooperation of the bearing surfaces 15 and the shoulders 19 will tend to centralize the spring and to maintain it in position while the safety bar 16 is being applied.

The safety bar 16 may then have one end thereof inserted into one end of the housing, and it may then be pushed longitudinally in between the spring plank and the bow 18 of the spring until its extended end portions 20 are positioned as desired beyond opposite sides of the spring plank. On pushing in the safety bar the advancing end of the same will ride over the crest of the bow 18 and depress the same, thereby placing it under tension, with the result that the shoulders 19 mutually interlock with the bearing surfaces 15, and hold the spring in its definite position. When the safety bar has been brought into contact at its advancing end with the toe or stop 21 at that end of the spring, the other toe 21 will snap over the opposite end of the safety bar, and thereby the safety bar will be securely locked in position.

Preferably when the single safety bar is properly assembled with the single shock absorbing spring, the latter being under tension not only along its mid-length, but at its end portions 20, a bearing surface 22 of more or less area is provided at the mid-length of the spring, while other bearing surfaces 23 are provided at the outer ends of the spring adjacent to the toes 21, these surfaces bearing upon the safety bar.

When the safety bar or the like and such a spring are properly set in position with the spring under tension, the spring exerts its pressure at a plurality of points and principally upon the extended end portions of the safety bar, and the parts will be locked in their assembled position and at the same time vibration of the extended ends of the bar will be reduced to a minimum if not absolutely eliminated, as the latter is the purpose in view. In order to assemble and apply the parts it is not necessary for a worker to go to the center of the car truck, or to do so in removing the safety bar, and if the preferred simple form of the present invention is resorted to, the omission of various additional fastenings or the like is the result. Should a spring become broken, the parts will be retained in position for a reasonable length of time.

Obviously the present invention may be used not only with a spring plank but upon a plankless class of truck which is now coming into general use on new equipment. In such case the bottom of the bolster of the truck may have an integral box shaped member or housing 26 formed integrally therewith and extending transversely of the mid-length of the bolster, as shown in Figs. 4 and 5. This housing has rounded surfaces 27 and lips 28. On the other hand, the side frame 29 of a car truck may have an arm or bracket 30 cast integral therewith and extended therefrom and provided with an integral box-shaped member or housing 31 which has rounded surfaces 32 and lips 33. In both instances the safety bar and the shock absorbing spring may be applied to such housings in a similar manner to what has been shown and described.

Also instead of mounting a housing-like bracket upon a spring plank, the plank 34 may have depending brackets 35 at opposite sides which are provided with holes 36 for receiving the safety bar and spring, such brackets being formed with bearing surfaces 37 such as 15 previously described and with lips 38. In such case the bar would engage with the bottom of the spring plank.

Suitable means may be resorted to for surely retaining the safety bar or auxiliary support in the mounting therefor such as a housing for example, in case the spring in engagement with the bar is broken in service, as by providing longitudinal slits 24 in the opposite ends of the bar which enable lateral projections or stops 25 to be bent outwardly from such ends. Such means are disclosed in Patent No. 1,566,789, granted to Seth A. Crone. The workman places the safety bar provided with such slits 24 in proper operative position and then with a few smart blows a suitable hammer is caused to strike the parts of the bar below the slit and bends them outwardly to form the stops 25. If a bar is to be removed at anytime it is only necessary to break or cut off the stops 25 before pulling the bar out of its mounting.

It is preferred that the safety bar be of the well known standard type having a given cross-section throughout except at the terminal portions thereof, so that it is longitudinally movable for application at will for its full length, that is, it is preferred that the bar only be moved longitudinally to accomplish the mounting thereof upon the guide which constitutes a portion of the housing or bracket 11.

It will be obvious to those skilled in this art that other modifications than those suggested may be made without departing from the spirit of the invention as defined in the scope of the appended claims.

What I claim as new is—

1. A spring for holding a safety support, comprising a length of spring metal of preformed shape including means along its intermediate length providing spaced bearing areas at opposite surfaces of the spring for bearing upon a safety bar and a mounting therefor, respectively, and the ends of the spring being extended and adapted to engage with the ends of the safety bar.

2. A spring for holding a safety support, comprising a length of spring metal of preformed shape including a bowed portion providing spaced bearing areas at opposite surfaces of the spring for bearing upon a safety bar and a mounting therefor, respectively, and the ends of the spring being extended and adapted to engage with the ends of the safety bar.

3. A spring for holding a safety support, comprising a length of spring metal provided with means for engaging the mid-length of a safety bar and with means for locking with a mounting for the spring and safety bar, and the spring having means for locking with the ends of the safety bar.

4. A spring for holding a safety support, comprising a length of spring metal provided with means for engaging the mid-length of a safety bar and with means for locking with a mounting for the spring and safety bar, and the spring having means for locking with the ends of the safety bar, and the ends of the spring adapted to press upon the ends of the bar.

5. A spring for holding a safety support, comprising a length of spring metal having means at a plurality of points for bearing upon a safety bar along the length thereof, including the ends, and means for centralizing the spring in a mounting therefor.

6. A spring for holding a safety support, comprising a length of spring metal having means at a plurality of points for bearing upon a safety bar along the length thereof, including the ends, and means for centralizing the spring in a mounting therefor, and means for locking with the ends of the bar.

7. A spring for holding a safety support, comprising a length of spring metal havng means at a plurality of points for bearing upon a safety bar along the length thereof, including the ends, and means for centralizing the spring in a mounting therefor, and toes or projections for locking with the ends of the bar.

8. A spring for holding a safety bar, comprising a spring having means for locking with the ends of a safety bar.

9. In a brake beam safety support, the combination of a mounting on a member of a car truck, a safety bar or auxiliary support, and a shock absorbing spring for engaging with the ends of the bar, the bar being slidably engageable with or disengageable from the mounting and spring.

10. In a brake beam safety support, the combination of a mounting on a member of a car truck, a safety bar in the mounting and extended therebeyond at both ends for catching a brake beam, and means cooperating with the mounting and the extended ends preventing the whipping of such ends.

11. In a brake beam safety support, the combination of a mounting on a member of a car truck, a safety bar in the mounting and extended therebeyond at both ends for catching a brake beam, and pressure means stabilizing the bar from end to end.

12. In a brake beam safety support, the combination of a mounting on a member of a car truck, a safety bar extended at an end through the mounting sufficiently to catch a brake beam, and means separate from the bar for preventing the whipping of the end of the bar.

13. In a brake beam safety support, the combination of a housing on a member of a car truck, a safety bar therein and projecting at both ends beyond the housing, a spring in the housing and bearing on the bar and the ends of the housing, the spring having extended portions which bear on the projecting ends of the bar to absorb shocks.

14. In a brake beam safety support, the combination of a housing on a member of a car truck, a safety bar therein and projecting at both ends beyond the housing, a spring in the housing bearing on the projecting ends of the bar to absorb shocks.

15. In a brake beam safety support, the combination of a housing on a member of a car truck, a safety bar therein and projecting at both ends beyond the housing, a spring in the housing having means for locking with the projecting ends of the bar.

16. In a brake beam safety support, the combination of a housing on a member of a car truck, a safety bar therein and projecting at both ends beyond the housing, a spring in the housing having means at the ends in engagement with the projecting ends of the bar, for preventing the disengagement of the bar.

17. In a brake beam safety support, the combination of a housing on a member of a car truck, a safety bar therein and projecting at both ends beyond the housing, a spring in the housing, means for centering the spring in the housing, and means on the spring and cooperating with the bar at its ends and between its ends for stabilizing the bar.

18. A spring for holding a safety bar, comprising a spring having terminal means deflected away therefrom and providing shoulders facing each other for automatic snapping engagement with a safety bar to then interlock with the bar and secure it against longitudinal movement.

19. In a brake beam safety support, the combination of a housing on a member of a car truck, a safety bar therein and projecting at both ends beyond the housing, and a spring supported directly by the housing having bar interlocking means at the ends for preventing the disengagement of the bar.

20. In a brake beam safety support, the combination of a member of a car truck and having a guide, a safety bar supported thereby, said bar longitudinally movable onto or from the guide, and a spring supported by the member and having deflected stops to engage the bar, the spring exerting an upward pressure on the bar to prevent the dislocation of the bar from the guide, such spring longitudinally movable independently of bar.

21. In a brake beam safety support, the combination of a member of a car truck having a guide, a safety bar supported thereby, said bar longitudinally movable onto or from the guide, and a spring supported by the member and exerting an upward pressure on the bar at a point between its ends and approximately midway of the length of the guide, such spring also having stops outwardly beyond such pressure point, to engage the bar and to prevent the dislocation of the bar from the guide.

22. In a brake beam safety support, the combination of a member of a car truck and having a guide, a safety bar supported thereby, said bar longitudinally movable onto or from the guide, and a spring supported by the member and exerting an upward pressure on the bar, the guide and spring provided with means for mutually interlocking.

CHARLES R. BUSCH.